(12) United States Patent
Bolea et al.

(10) Patent No.: US 11,376,618 B2
(45) Date of Patent: Jul. 5, 2022

(54) SYSTEMS AND METHODS FOR STATUS INDICATION OF FLUID DELIVERY SYSTEMS

(71) Applicant: Carlisle Fluid Technologies, Inc., Scottsdale, AZ (US)

(72) Inventors: Phillip Angelo Bolea, Grant, MN (US); Eric Julius Donaldson, Saint Paul, MN (US)

(73) Assignee: CARLISLE FLUID TECHNOLOGIES, INC., Scottsdale, AZ (US)

( * ) Notice: Subject to any disclaimer, the term of this patent is extended or adjusted under 35 U.S.C. 154(b) by 0 days.

(21) Appl. No.: 16/293,630

(22) Filed: Mar. 5, 2019

(65) Prior Publication Data
US 2019/0275543 A1 Sep. 12, 2019

Related U.S. Application Data

(60) Provisional application No. 62/639,870, filed on Mar. 7, 2018.

(51) Int. Cl.
*B05B 12/00* (2018.01)
*B05B 9/08* (2006.01)
(Continued)

(52) U.S. Cl.
CPC .......... *B05B 12/008* (2013.01); *B05B 7/1693* (2013.01); *B05B 9/085* (2013.01);
(Continued)

(58) Field of Classification Search
CPC ... B05B 12/008; B05B 12/082; B05B 12/085; B05B 12/124; B05B 9/085; H04B 3/54
See application file for complete search history.

(56) References Cited

U.S. PATENT DOCUMENTS 4,019,653 A * 4/1977 Scherer .................. B01F 35/83
222/25
4,234,007 A * 11/1980 Titone .................. G05D 11/132
137/565.33
(Continued)

FOREIGN PATENT DOCUMENTS

CN 106794481 A 5/2017
DE 102014012140 A1 2/2016
(Continued)

OTHER PUBLICATIONS

International Search Report and Written Opinion for PCT Application No. PCT/US2019/020902 dated May 7, 2019, 20 pgs.
(Continued)

*Primary Examiner* — Sisay Yacob
(74) *Attorney, Agent, or Firm* — Fletcher Yoder P.C.

(57) ABSTRACT

A fluid delivery system includes a status indicator and control system comprising a processor. The processor is configured to receive a first signal indicative of a first status of operations of a spray application system. The processor is further configured to provide to an operator of a spray gun, via a display system, a visualization representative of the first status of operations, and techniques to control the fluid delivery system, wherein the spray application system is configured to deliver at least one fluid to the spray gun during operations.

20 Claims, 6 Drawing Sheets

(51) Int. Cl.
*B05B 12/08* (2006.01)
*B05B 12/12* (2006.01)
*H04B 3/54* (2006.01)
*B29B 7/74* (2006.01)
*B29B 7/60* (2006.01)
*B05B 7/16* (2006.01)
*B29B 7/72* (2006.01)
*G02B 27/01* (2006.01)
*B05B 12/14* (2006.01)
*F16L 11/127* (2006.01)
*B05B 7/04* (2006.01)
*H01R 13/00* (2006.01)
*B05B 7/00* (2006.01)

(52) U.S. Cl.
CPC .......... *B05B 12/004* (2013.01); *B05B 12/082* (2013.01); *B05B 12/085* (2013.01); *B05B 12/124* (2013.01); *B29B 7/603* (2013.01); *B29B 7/72* (2013.01); *B29B 7/7428* (2013.01); *B29B 7/7438* (2013.01); *H04B 3/54* (2013.01); *B05B 7/0018* (2013.01); *B05B 7/0408* (2013.01); *B05B 7/166* (2013.01); *B05B 12/1418* (2013.01); *F16L 11/127* (2013.01); *G02B 27/017* (2013.01); *H01R 13/005* (2013.01)

(56) References Cited

U.S. PATENT DOCUMENTS

| | | |
|---|---|---|
| 5,073,709 A | 12/1991 | Lunzer et al. |
| 2001/0032892 A1 | 10/2001 | Brooks et al. |
| 2005/0127201 A1* | 6/2005 | Matsumoto ........... B05B 12/008 239/71 |
| 2009/0071665 A1 | 3/2009 | Shoap |
| 2010/0229953 A1* | 9/2010 | Stuart ................ B08B 3/02 137/1 |
| 2011/0216188 A1* | 9/2011 | Thwing ................ G06K 9/00 348/135 |
| 2012/0072035 A1 | 3/2012 | Nielsen et al. |
| 2012/0205459 A1 | 8/2012 | Bebb et al. |
| 2013/0015262 A1* | 1/2013 | Monchamp ........... B29B 7/7615 239/61 |
| 2013/0122186 A1* | 5/2013 | Hoppel ................ B05B 12/12 118/712 |
| 2014/0042238 A1* | 2/2014 | Mather ................ B05B 15/55 239/11 |
| 2014/0084075 A1* | 3/2014 | Vandelli ............... G01F 15/005 239/1 |
| 2014/0087061 A1* | 3/2014 | Khoury ................ B05B 12/087 427/8 |
| 2015/0102121 A1 | 4/2015 | Dey et al. |
| 2015/0108244 A1 | 4/2015 | Pruiett et al. |
| 2015/0251199 A1 | 9/2015 | Mickols et al. |
| 2016/0045925 A1* | 2/2016 | Frauen ................ B05B 12/124 427/256 |
| 2016/0107179 A1 | 4/2016 | McAndrew et al. |
| 2017/0259288 A1* | 9/2017 | Scott ................ G05B 19/041 |
| 2018/0247245 A1 | 8/2018 | Dorneanu |

FOREIGN PATENT DOCUMENTS

| | | |
|---|---|---|
| EP | 1281444 A1 | 2/2003 |
| EP | 2055391 A2 | 5/2009 |
| JP | S53113229 A | 10/1978 |
| JP | 2008209469 A | 9/2008 |
| JP | 2010000482 A | 1/2010 |
| WO | 2012026489 A1 | 3/2012 |
| WO | 2016127106 A1 | 8/2016 |

OTHER PUBLICATIONS

European Office Action for EP Application No. 19713252.5, dated Oct. 12, 2021, 9 pgs.
Japanese Office Action for JP Application No. 2020-546900, dated Nov. 2, 2021, 3 pgs.
Chinese Office Action for CN Application No. 201980029109.9, dated Nov. 18, 2021, 12 pgs.

* cited by examiner

SYSTEMS AND METHODS FOR STATUS INDICATION OF FLUID DELIVERY SYSTEMS

CROSS REFERENCE TO RELATED APPLICATIONS

This application claims priority from and the benefit of U.S. Provisional Application Ser. No. 62/639,870, entitled "SYSTEMS AND METHODS FOR STATUS INDICATION OF FLUID DELIVERY SYSTEMS," filed Mar. 7, 2018, which is hereby incorporated by reference in its entirety for all purposes.

Some fluid delivery systems, such as Spray Polyurethane Foam (SPF) systems are used for applying foam insulation to residential or commercial structures. These systems deliver one or more materials through hoses from a stationary pumping system (e.g., proportioner system) to a spray foam gun used to apply the material to a structure. The proportioner system may be located at a distance from the actual foam application work area and spray foam gun. It would be useful to improve proportioner system status indication and control of fluid delivery systems.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a fluid delivery system includes a status indicator system comprising a processor. The processor is configured to receive a first signal indicative of a first status of operations of a spray application system. The processor is further configured to provide to an operator of a spray gun, via a display system, a visualization representative of the first status of operations, wherein the spray application system is configured to deliver at least one fluid to the spray gun during operations.

In a second embodiment, a method includes receiving, at a status indicator system comprising a processor, a first signal indicative of a first status of operations of a spray application system. The method additionally includes displaying to an operator of a spray gun, via a display system, a visualization representative of the first status of operations, wherein the spray application system is configured to deliver at least one fluid to the spray gun during operations.

In a third embodiment, a tangible, non-transitory, computer-readable medium include instructions that when executed by a processor cause the processor to receive, at a status indicator system comprising a processor, a first signal indicative of a first status of operations of a spray application system. The instructions further cause the processor to display to an operator of a spray gun, via a display system, a visualization representative of the first status of operations, wherein the spray application system is configured to deliver at least one fluid to the spray gun during operations.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In systems that transmit liquids or gases from a source location to a delivery location (or locations), status indication and system control available to a human (e.g., fluid applicator) may be important for improved application control, information presentation, fluid control, and so on. One example of systems that may benefit from improved status indication and control are Polyurethane Foam (SPF) insulation systems. The SPF systems use a pressurized hose assembly to transmit two or more fluids between a proportioning system and a spray gun that is near a foam target, such as a wall. The proportioning system is may include fluid pumps and heaters, supply drums, control system, user interface, sensors, and associated electronics. The proportioning system may be located in a truck or trailer outside of a building that foam insulation is being applied to. The fluids used to provide the insulation may be mixed at high pressure and ejected from the spray gun to initiate the chemical reaction that that results in cured foam.

In many SPF systems, status indicators and control parameters are located at or on the proportioning system, which can be several hundred feet away from where the spray foam applicator (i.e., person applying the spray foam) is working. The spray foam applicator may have special skills that improve the success of the operation, however this person may lack access to real-time system information and/or system controls that affects behavior of the spray foam process because the information and control point is usually kept a distance away in the proportioning system. Further, the spray gun operator usually wears Personal Protective Equipment (PPE) that may burden his/her ability to return to the proportioning system to adjust settings and/or determine status of the equipment and material supplies.

The proportioning system may control the pressure, temperature, and mass flow ratio of two reacting fluids (e.g., denoted as A and B) that are mixed within the spray gun and ejected onto a target substrate in or on the structure being insulated. The applicator usually lacks means for easily determining the status of the remote components of the proportioning system and adjust controls when applying foam within the structure. As a result, the applicator may be unaware of certain warning or error conditions that may occur within the proportioning system, and may be incapable of making adjustments without returning to the proportioning system. Also, if the proportioning system is unable to maintain pressure, temperature, or fluid ratio within user-specified control limits, the applicator may only be aware of such conditions by noticing changes to the foam output or quality. Relying on subjective observations is problematic and may not be detected by the applicator in a timely manner. If such changes are not detected by the applicator, foam quality, consistency, and/or yield may suffer.

Situations may also arise where an a priori or immediate warning of fault condition in the proportioning system would prevent certain unwanted conditions from occurring. An example of such a fault condition is when one of the materials (A or B) is nearing an empty state. If the material is exhausted the proportioning system may inject material from one side (e.g. B) into the other side (e.g. A) of gun passages. This can result in solidification of material with the gun and/or hose and significant downtime and cost to address the problem. Many other potential error states can occur which would render the system inoperable until service could be performed. Communication of these potential or actual problems to the applicator in a timely manner can improve uptime and reduce service and repair costs.

The techniques described herein include more simple and intuitive status indication systems and control methods for use in liquid application systems, such as SPF systems. While described in the context of commercial and residential SPF applications, it is obvious this approach could be used in other similar systems where a human applicator is spraying or depositing a material onto a substrate while remote from the actual controlling process equipment.

It may be useful to describe a system that may apply the status indicator and system control techniques that may be combined with fluid delivery and the electrical delivery hoses as described herein. Accordingly and turning now to FIG. 1, the figure is a block diagram illustrating an embodiment of a spray application system 10 (e.g., Spray Polyurethane Foam (SPF) system) that may include one or more liquid pumps 12, 14. The spray application system (e.g., spray delivery system) 10 may be suitable for mixing and dispensing a variety of chemicals, such as a chemicals used in applying spray foam insulation. In the depicted embodiment, chemical compounds A and B may be stored in tanks 16 and 18, respectively. The tanks 16 and 18 may be fluidly coupled to the pumps 12 and 14 via conduits or hoses 20 and 22. It is to be understood that while the depicted embodiment for the spray application system 10 shows two compounds used for mixing and spraying, other embodiments may use a single compound or 3, 4, 5, 6, 7, 8 or more compounds. The pumps 12 and 14 may be independently controlled.

Figure 1:
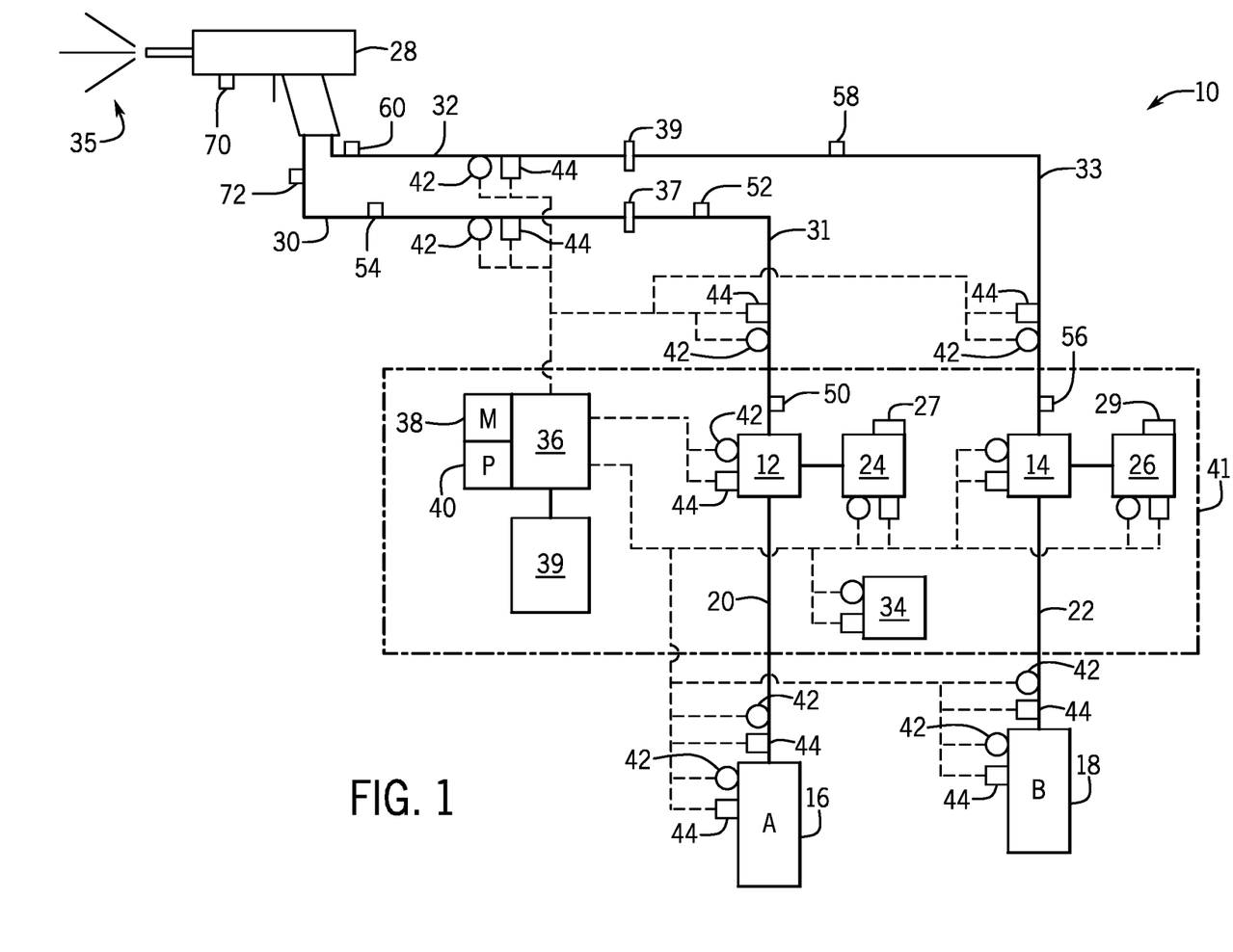
FIG. 1 is block diagram of an embodiment of a spray application system.

During operations of the spray application system 10, the pumps 12, 14 may be mechanically powered by motors 24, 26, respectively. In a preferred embodiment, the motors may be electric motors. However, internal combustion engines (e.g., diesel engines), pneumatic motors, hydraulic motors, or a combination thereof. Motor controllers 27 and 29 may be used to provide for motor start/stop, loading, and control based on signals transmitted, for example, from the processor 40. The motor 24 may be of the same type or of a different type from the motor 26. Likewise, the pump 12 may be of the same type or of different type from the pump 14. Indeed, the techniques described herein may be used with multiple pumps 12, 14, and multiple motors 24, 26, which may be of different types. It is also understood that while two motors are shown, other embodiments may use motor 24 or 26 mechanically coupled to pumps 12, 14, for example, via a shaft.

The pumps 12, 14 provide for hydrodynamic forces suitable for moving the compounds A, B into a spray gun system 28. More specifically, compound A may traverse the pump 12 through conduit 20 and then through heated conduits 31, 30 into the spray gun system 28. Likewise, compound B may traverse pump 14 through conduit 22 and then through heated conduits 33, 32 into the spray gun system 28. To heat the heated conduits 20, 22, 30, 31, 32, 33, a heating system 34 may be provided. The heating system 34 may provide for thermal energy, such as a heated fluid, suitable for pre-heating the compounds A and B before mixing and spraying and for heating the compounds A and B during mixing and spraying. The conduit 31 may be connected to the conduit 30 via a hose fitting 37. The conduit 33 may be connected to the conduit 32 via a hose fitting 39.

The spray gun system 28 may include a mixing chamber to mix the compounds A and B. For spray foam insulation applications, the compound A may include isocyanates while the compound B may include polyols, flame retardants, blowing agents, amine or metal catalysts, surfactants, and other chemicals. When mixed, an exothermic chemical reaction occurs and a foam 35 is sprayed onto a target. The foam then provides for insulative properties at various thermal resistance (i.e., R-values) based on the chemicals found in the compounds A and B.

Control for the spray application system 10 may be provided by a control system 36. The control system 36 may include an industrial controller, and thus include a memory 38 and a processor 40. The processor 40 may include multiple microprocessors, one or more "general-purpose" microprocessors, one or more special-purpose microprocessors, one or more application specific integrated circuits (ASICS), and/or one or more reduced instruction set (RISC) processors, or some combination thereof. The memory 38 may include a volatile memory, such as random access memory (RAM), and/or a nonvolatile memory, such as ROM, a hard drive, a memory card, a memory stick (e.g., USB stick) and so on. The memory 38 may include computer programs or instructions executable by the processor 40 and suitable for controlling the spray application system 10. The memory 38 may further include computer programs or instructions executable by the processor 40 and suitable for detecting pump 12, 14 slip and for providing ratio control actions to continue providing as desired ratio (e.g., 1:1) for compounds A and B in the presence of slip, as further described below.

The control system 36 may be communicatively coupled to one or more sensors 42 and operatively coupled to one or more actuators 44. The sensors 42 may include pressure sensors, flow sensors, temperature sensors, chemical composition sensors, speed (e.g., rotary speed, linear speed) sensors, electric measurement sensors (e.g., voltage, amperage, resistance, capacitance, inductance), level (e.g., fluid level) sensors, limit switches, and so on. The actuators 44 may include valves, actuatable switches (e.g., solenoids), positioners, heating elements, and so on.

A user or users may interface with the control system 36 via an input/output (I/O) system 39, which may include touchscreens, displays, keyboards, mice, augmented reality/virtual reality systems, as well as tablets, smartphones, notebooks, and so on. A user may input desired pressures, flow rates, temperatures, ratio between compound A and compound B (e.g., 1:1), alarm thresholds (e.g., threshold fluid levels of compound A, B in tanks 16, 18), and so on. The user may then spray via the spray gun system 28 and the control system 36 may use the processor 40 to execute one or more programs stored in the memory 38 suitable for sensing system 10 conditions via the sensors 42 and for adjusting various parameters of the system 10 via the actuators 44 based on the user inputs. The I/O system 39 may then display several of the sensed conditions as well as the adjusted parameters. Certain components of the spray application system 10 may be included in or interface with a proportioner system 41. The proportioner system 41 may "proportion" or deliver the compounds A, B at a specified ratio (e.g., 1:1) to achieve the spray 35. In this manner, the user(s) may mix and spray chemicals, such as compounds A and B, to provide for certain coatings, such as insulative spray foam.

The proportioner system 41 controls pressure, flow, and temperature of the fluids based on setting provided by the user. The proportioner system 41 is generally located at a distance from the actual foam application work area and spray foam gun 28. In most of these systems, temperature and/or pressure sensing of one or more of the fluids near the spray gun 38 is desired to provide proper fluid mixing of the materials at the spray gun. In most of these systems, control parameters and status indicators are all located at the proportioning system 38, which can be several hundred feet away from where the spray foam applicator is working. The spray foam applicator has special skills that determine the success of the operation, however this person may not have access to real-time and sometimes critical system information that affect the quality of the spray foam 35 process. In addition, the spray foam applicator may lack the ability to make changes to operating parameters, or to stop and/or start the proportioning system without leaving the spray area. It is not efficient for the spray foam applicator to return to the proportioner system 41 to discover status or diagnostic information, or to make changes to the operating parameters related to the spray foam application system 10. The spray gun operator wears Personal Protective Equipment (PPE) that further burdens his/her ability to return to the proportioner system 41 to adjust settings and/or determine status of the equipment and material supplies. The pressurized hoses 20, 22, 30, 31, 32 and/or 33 operate in a harsh environment and are subject to abuse typical of construction sites.

The techniques described herein include novel solutions to the issues outlined above, and present new unanticipated capabilities for fluid delivery systems, and in particular, to SPF systems such as system 10. Other examples include paint spray systems, industrial/chemical mixing and processing, systems, and fuel and hydraulic delivery systems. Any process or system that uses a hose to transport fluids from one location to another and where communication of information to the user is desired, are candidates for the techniques described herein.

The flexible hoses 20, 22, 30, 31, 32 and/or 33 may not only provide for the delivery of fluids, but also for the delivery of electricity (e.g., electrical signals, electrical power). Likewise, the hose fittings 37, 39 may not only connect the hoses 30, 31, and 32, 33 to each other, but also deliver the electricity between the hoses 30 and 31 and the hoses 32 and 33. To deliver electricity, the hoses 20, 22, 30, 31, 32 and/or 33 may include conductive elements. The fittings 37, 39 may be made of metal and/or include crimping connections to the conductive elements of the hoses, also as further described below.

The hoses 20, 22, 30, 31, 32 and/or 33 may be used to communicatively couple master hub(s) to slave hub(s). For example, master hub 50 may be communicatively coupled to slave hubs 52, 54. Likewise, master hub 56 may be communicatively coupled to slave hubs 58, 60. The master hubs 50, 56 may provide any information available in the proportioning system 41, including temperatures, pressures, flow rates, types of compounds A and B, and so on.

The slave hubs, 52, 54, 58, 60 may collect, process, and communicate certain parameters (e.g. fluid temperature and/or pressure) to the master hubs 50, 56 that are at the proportioner 41. This data can then be used to control pumps 12, 14 and heating system 34 in the proportioner 41, or in the spray foam hoses 20, 22, 30, 31, 32 and/or 33, to provide optimum fluid conditions at or near the slave hubs 52, 54, 58, 60. The master hubs 50, 56 can also communicate operating and/or equipment parameters to the slave hub(s) 52, 54, 58, 60 that can be displayed to the spray foam applicator (e.g., the user of the spray gun 28). An example of this would be providing an optical signal to the spray foam operator to indicate the status of the proportioning system 41, remaining fluid remaining in bulk storage tanks 16, 18 near the proportioner 41, or pressure and temperature readings at or near the gun 28. This approach can also allow the slave hubs 52, 54, 58, 60 to act as a wireless (e.g. BLE) communication access point to local devices near the respective slave hub. Such devices could include wearable electronic displays with processors and wireless (BLE) capabilities that provide proportioner status indication and control of operating parameters. The slave hubs 52, 54, 58, 60 can also be used to power and control indicator lights or light projectors 70, 72 disposed on the hoses 20, 22, 30, 31, 32 and/or 33 and/or on gun 28 itself. Other lights (or light projectors) may be disposed on gloves, clothing, PPE, and so on, as further described below.

Figure 2:
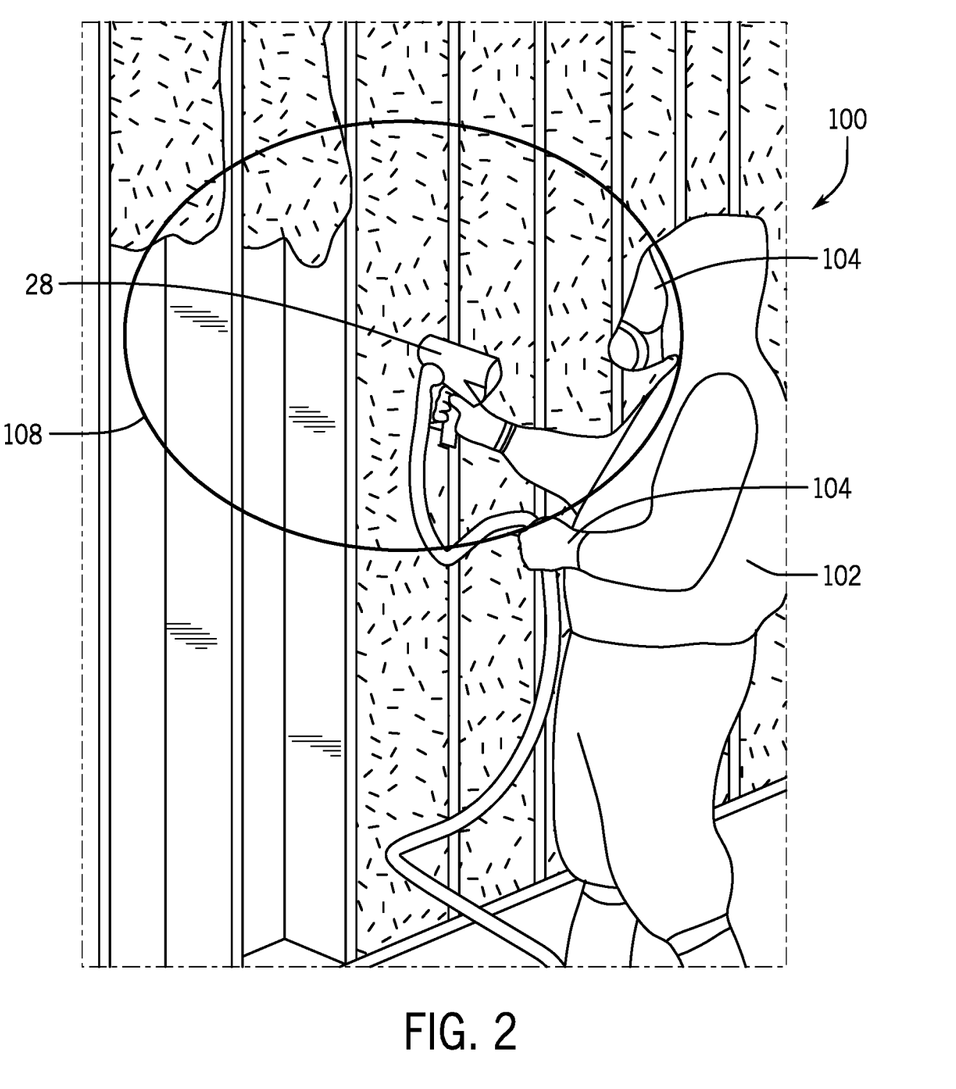
FIG. 2 is a diagram of an embodiment of the fluid system of FIG. 1 while in use.

Turning now to FIG. 2, the figure is a view of an embodiment of the gun 28 during use by a user 100. As illustrated, the user 100 may be wearing protective equipment such as a suit 102, respirator or filtered mask 104, and gloves 106. The user's field of vision 108 is also shown, representative of a work area viewable by the user 100. With the techniques described herein, status indicator systems, e.g., lights or light projectors 70, 72, may provide proportioner 41 and/or material 16, 18, supply status in a visual manner within the applicators field of vision. A color, temporal nature of the light (e.g. flashing, steady, dimming, brightening), and number of light emitting devices (e.g., 70, 72) may be used to provide feedback to the user on the status of the proportioning system 41 or other indications of interest to the applicator.

One example of status indication is as follows. When the proportioning system 41 is operating within specified control parameters (e.g. fluid pressure, temperature, and ratio) indicator light (or lights) 70, 72 would display a steady green. If A 16 or B 18 fluid levels are approaching empty conditions, the light (or lights) 70, 72, would change to flashing green. If the proportioning system 41 was near the boundary of a defined tolerance range (e.g., near a temperature min/max, pressure min/max, flow rate min/max), the light (or lights) 70, 72 would change to steady yellow. If the proportioner 41 was operating outside of a defined tolerance range (e.g., outside of a temperature min/max, pressure min/max, flow rate min/max), the light (or lights) 70, 72 would change to flashing red. Finally, if the proportioning system 41 would benefit from immediate attention and cessation of foam application, the light (or lights) 70, 72 would be changed to steady red color.

While a single light may communicate many proportioner system 41 conditions, two (or more) lights may provide even more information. As an example, if separate lights (e.g., 70, 72) are used on both A and B hoses, e.g., hoses 20, 22, 30, 31, 32 and/or 33, the lights could operate independently to indicate the status of A 16 and B 18 fluid conditions independently. With this approach, the color, the temporal nature of the light (e.g. flashing, steady, dimming, brightening), and the number of light emitting devices can be used to convey a range of unique system states. Other status indicator systems such as projectors suitable for displaying visual information (e.g., text, images, video) may also be used to project the visual information onto the viewable area 108.

Figure 3:
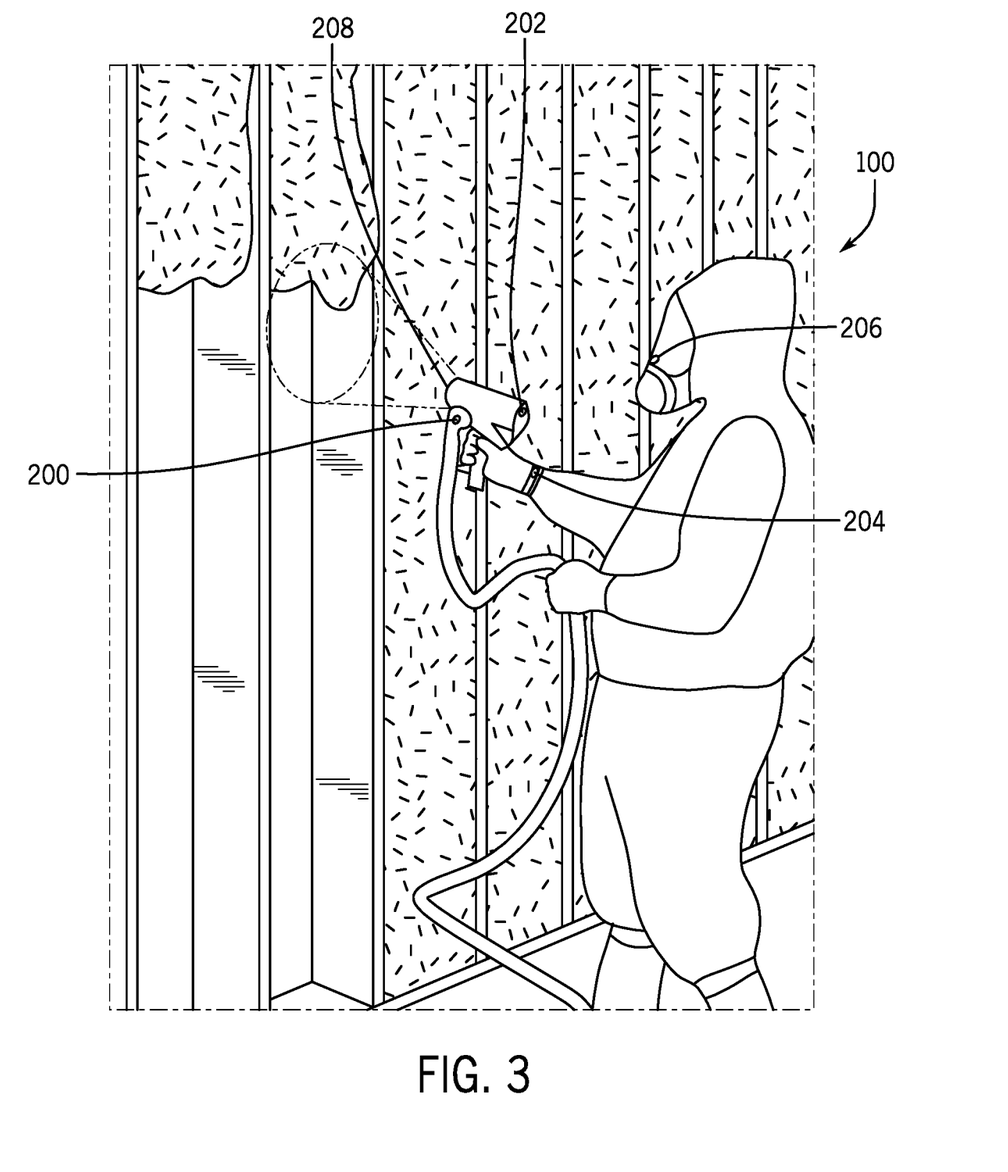
FIG. 3 is a diagram of an embodiment of the fluid system of FIG. 1 while in use with various light devices.

FIG. 3 shows several embodiments of the techniques described herein. As shown, the indicating light emitting device (or devices) 200 could be associated with one or more hoses (Box #1 in FIG. 3). Likewise, light emitting device (or devices) 202 may be placed on the gun 28 (Box #2 in FIG. 3). Similarly, light emitting device (or devices) 204 may be placed on a wearable device to be carried by the user 100 on a wrist or hand (Box #3 in FIG. 3). Additionally, light emitting device (or devices) 206 may be placed on or within the user's protective equipment of clothing (Box #4 in FIG. 3). Finally, light emitting device (or devices) 208 may be used to project color, text, images, and/or video onto the target surface from a location on the gun 28 (Box #5 of FIG. 3). The light display systems 200, 202, 204, 206, 208 may include LED lights, laser lights, light projectors (including laser projectors) that display text, images, video, and/or predictive spray area (e.g., on the work area), and the like. Additionally or alternatively, the systems 200, 202, 204, 206, 208 that may be in close proximity to the user 100 may include haptic feedback systems so that the user may feel a tap, vibration, or the like, with tap frequency and/or force representative of certain information. It is to be also noted that the systems 200, 202, 204, 206, 208 may be used alone or in combination with one another. Accordingly, the systems 200, 202, 204, 206, 208 may be referred to as display systems and/or haptic systems.

In a first embodiment shown in FIG. 3, the light emitting device 200 is integrated in the hose assembly at or near the connection to the spray gun 28. Such a device 202 may include a light source, a power unit and controller for the light source, and/or optical elements to diffuse or project the light source in a manner that can be more easily detected by the applicator 100. In one embodiment, the light source is a monochromatic or multi-spectral Light Emitting Diode (LED). The light source could also be several separate color LEDs combined in one small package. The light source may powered by separate conductors that attach to the proportioner 41 directly, by local energy storage (e.g. batteries), or by a voltage differential carried directly within or between hoses (e.g. in the metal reinforcement within the hose construction). The control of the light source can be provided via separate electrical or fiber optic conduits coupled to the proportioner 41, by a wireless communication module attached to the hose, or by electrical signals that are communicated over conductive hose elements from the proportioner 41 to a small receiving device attached to the hose near the light emitting device 200, 202, 204, 206, 208. The light source could also be located remotely from the hose/gun connection area, but optically coupled to a diffusing element at the hose/gun connection area by means of a fiber optic element.

The second device 202 in FIG. 3 shows a similar approach that involves a light emitting device that is attached or integral to the gun 28. As previously described, the light can be powered by wired connections to the proportioner 41, by local energy storage devices, or by a voltage differential carried directly within the hose construction. Also as previously described, control of the light source can be over separate signal lines running to the proportioner 41, by a wireless communication module attached to the hose, or by electrical signals that are communicated over conductive hose elements from the proportioner 41 to a small receiving device attached to the hose near the light emitting device 202.

In the wearable device 204 of FIG. 3, a similar approach may be used whereby indicator lights, icons, or symbols are within the field of vision of or worn by the applicator 100. In this case, the wearable device 204 would be powered by an energy storage device, and status and control settings would be communicated to and from (respectively) the wearable device by a wireless communication module attached to the hose that receives and transmits the status signals over conductive hose elements from the proportioner. The wearable device 204 may also include haptic feedback, for example, via a vibrating motor.

In the device 206 of FIG. 3, the light source is contained within and/or projected onto the face mask used by the applicator 100. As in device 204, the light source would be powered by an energy storage device, and status would be communicated to the light source microcontroller by a wireless communication module attached to the hose that receives and transmits the status signals over conductive hose elements from the proportioner 41. Projection onto the face mask may also include heads up display (HUD) techniques were text, images, video, colors, and the like, are projected so that a virtual display is available for viewing by the user 100.

In the device 208, the light source is projected onto the substrate directly in the viewing area of the applicator 100 from a source integral or attached to the spray gun 28. As previously described, the light can be powered by wired connections to the proportioner 41, by local energy storage devices, or by a voltage differential carried directly within the hose construction. In the same manner as previously described, control of the light source can be over separate signal lines running to the proportioner 41, by a wireless communication module attached to the hose, or by electrical signals that are communicated over conductive hose elements from the proportioner 41 to a small receiving device attached to the hose near the light emitting device.

Figure 4:
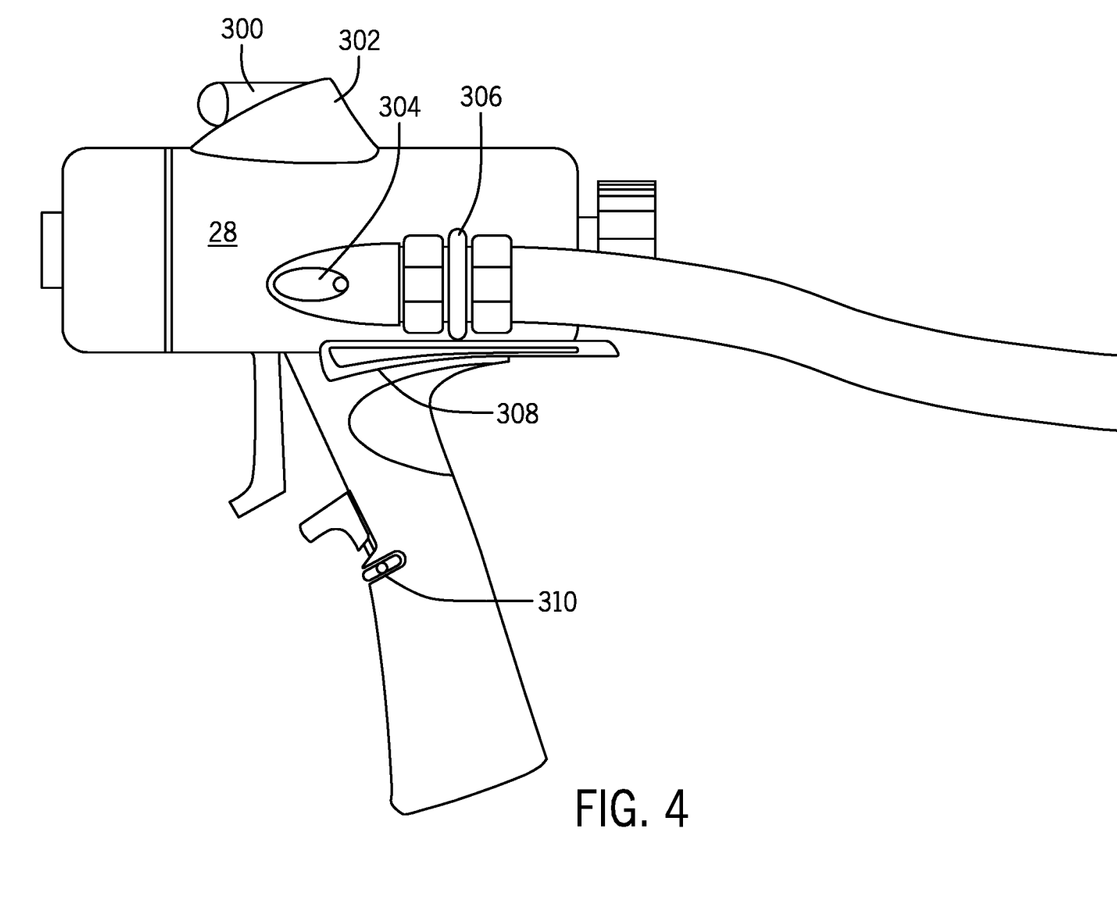
FIG. 4 is a diagram of an embodiment of a spray gun for the fluid system of FIG. 1.

FIG. 4 is a side view of an embodiment of the gun 28 which may include various of the techniques described herein. Work light(s) 300 may include ultra-high intensity LED lights suitable for illuminating the work area. A heads up display port 302 may be used to inform the operator of certain conditions, such as ambient thermal conditions (e.g., work area temperature) and may communicate with a HUD in the operator's mask via wired and/or wireless techniques (e.g., Bluetooth, WiFi, mesh networking, and so on). A laser port 304 may include a laser suitable for projecting a spray pattern, such as a pattern of dots, a circle shape, and so on, representative of a predictive spray pattern based on distance to the spray surface, type of materials used for spraying (e.g., 16, 18), pressures, temperatures, flow rates, gun 28 nozzle, gun 28 type, and so on.

A status indicator 306 may change color to indicate status of hose and material being sprayed, such as levels of material 16, 18. The gun 28 may also include features to improve usability, such as an adjustable thumb-web rest 308 and an adjustable finger rest 310. The adjustable thumb-web rest 308 may adjust fore and aft with a vertical rotation to better fit personal operator 100 preferences. The adjustable thumb-web rest 308 may additionally or alternatively relieve or eliminate carpal pressures due to gun 28 and/or hose weight. The adjustable finger rest 310 may adjust upwards and downwards along the gun's handle to improve operator fit and personal preferences.

Figure 5:
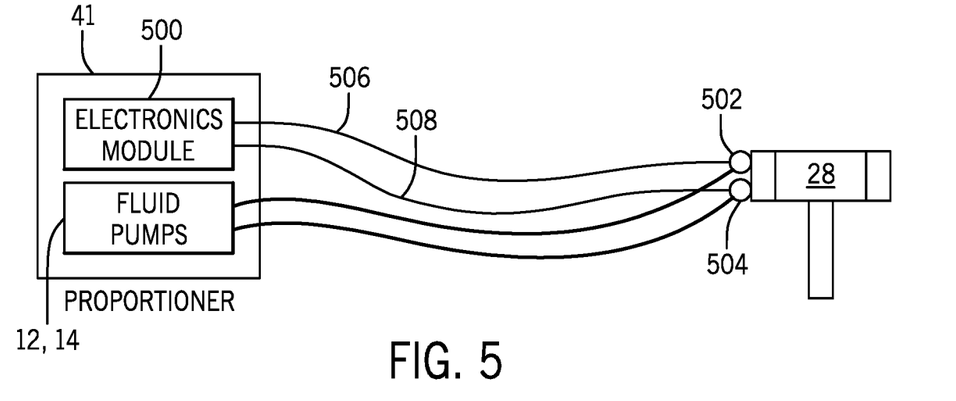
FIG. 5 is a block diagram of a proportioner system of the fluid system of FIG. 1 coupled to lights.

As described earlier, different techniques may be used to provide power and communication signals to the light indicators. FIG. 5 shows one embodiment, whereby the light sources (which may be LEDs) are controlled and powered from the proportioner's 41 electronics. For example, an electronics module 500 (e.g., could be the control system 36 or a component of the control system 36) may send power to LED lights 502, 504 via conduits 506, 508. The lights 502, 504 may be used to communicate status of material (e.g., levels of 16, 18) delivered via fluid pumps 12, 14 and A and B hoses (e.g., hoses 20, 22, 30, 31, 32 and/or 33).

Figure 6:
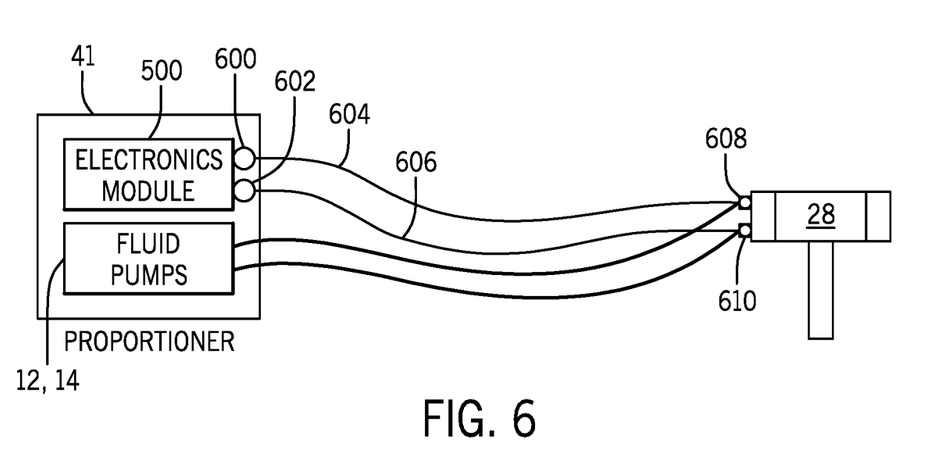
FIG. 6 is a block diagram of a proportioner system of the fluid system of FIG. 1 having certain lights.

FIG. 6 illustrates an embodiment where lights 600, 602 are disposed on the proportioner 41 and controlled via the electronics module 500. Fiber optic techniques may be used, such as fiber conduits 604, 606, to transmit light from the lights 600, 602 to other light elements 608, 610 disposed at various locations, such as the gun 28, A, B hoses, and so on. By providing for a source of light at the proportioner 41, it may be easier to maintain the lights and to change the lights during operations.

Figure 7:
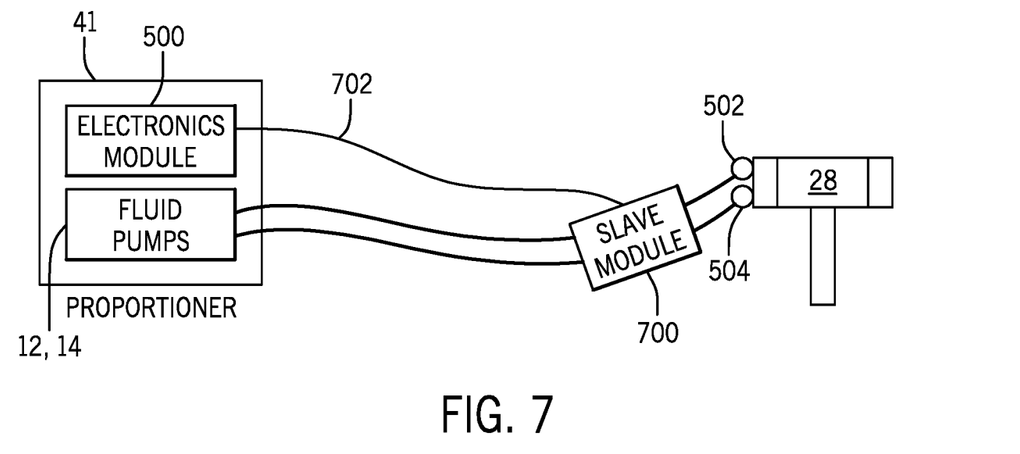
FIG. 7 is a block diagram of a proportioner system of the fluid system of FIG. 1 coupled to lights via a slave modem.

FIG. 7 illustrates an embodiment where the light emitter(s) 502, 504 are powered and controlled from a small electronic "slave modem" 700 near the spray gun 28, possibly (but not necessarily) attached to a spray hose A, B, to the spray gun 28, or to a combination thereof. The slave modem 700 may receive power and/or communication signals from the proportioner electronics, e.g., from module 500, and may then control the light emitters 502, 504 based on the communications. In the depicted embodiment, conduits 702 are used to deliver the power and/or signals to the model 700.

Figure 8:
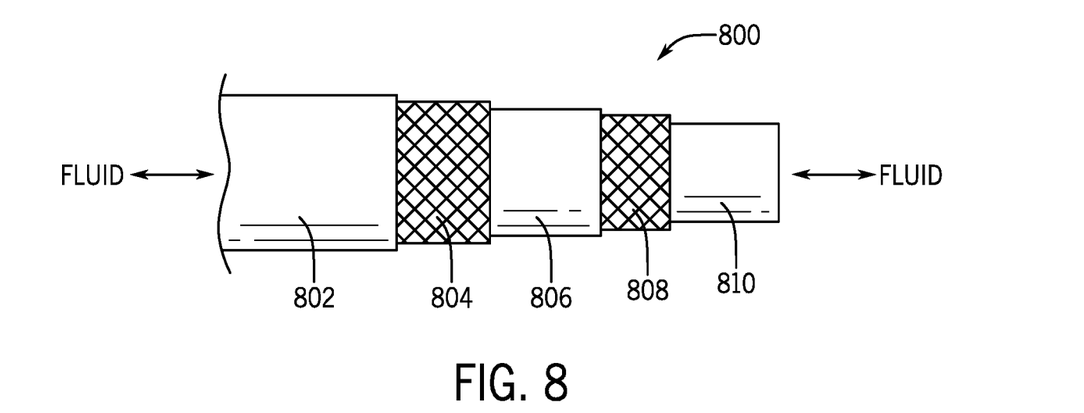
FIG. 8 is a sectional view of a smart hose that may be used by the fluid system of FIG. 1.

Turning now to FIG. 8, the figure is a side view of an embodiment of an electrically conductive "smart" hose 800. The hose 800 may be included in the hose 20, 22, 30, 31, 32 and/or 33. In the depicted embodiment, the hose 800 may include an outer insulation jacket 802, an outer metal braid (e.g., outer shield) 804, an outer dielectric (e.g., electric insulator) 806, an inner braid 808, and a hollow inner dielectric (e.g., electric insulator) 810. Fluid may flow through the hollow inner dielectric 810, completely traversing the electrically conductive hose 800. Layers 804, 808 may thus be electrically conductive elements used to conduct signals from the proportioner system 41 to display systems (e.g., systems 200, 202, 204, 206, 208). The conductive layers or layers 804, 808 lie within the hose 800 construction as braided layers or as a wound wire or foil layer within the hose 800 construction. If a reference layer is required (e.g. neutral, ground, return) then the two layers 804 and 808 of conductive material are required. If two conductive hoses are used, one can be used for the reference power and/or signal. In this two conductive hose scenario, only one conductive element 804 or 808 is used per hose. The conductive layers may be made of metals, metal alloys, or a combination thereof. The dielectric layers may be made of plastics (e.g., polymeric materials, both natural polymers as well as artificial polymers), rubber, silicone, and so on, that have dielectric properties or that are low (or no) conductors of electricity. The hose 800 may be used to provide power and/or signals to the various devices 200, 202, 204, 206, 208 described above. For example, the hose system 800 may provide for power line communications (PLC) via layers 804 and/or 808. PLC may include amplitude shift keying, frequency modulation, or a combination thereof.

The invention claimed is:

1. A method, comprising:
receiving, at a status indicator system comprising a processor, a first signal indicative of a first status of operations of a spray application system; and
displaying to an operator of a spray gun, via a display system, a visualization representative of the first status of operations, wherein the spray application system comprises a proportioner system configured to control a flow of a plurality of fluids to achieve a specified ratio of the plurality of fluids in a spray foam of the spray gun during operations, to apply temperature to control a temperature of the fluids, and to communicatively couple to the status indicator system, wherein the display system is configured to be mounted on the spray gun, worn by the operator, or a combination thereof, wherein the first status of operations comprises a spray foam status for the proportioner system.

2. The method of claim 1, wherein the display system comprises a colored light and wherein the visualization comprises a color representative of the first status of operations, a text, an image, or a combination thereof, representative of the first status of operations.

3. The method of claim 1, comprising receiving the signal from a sensor disposed in the spray application system, and wherein the sensor comprises a pressure sensor, a temperature sensor, a fluid level sensor, a flow sensor, a chemical composition sensors, a speed sensor, and electric measurement sensor, or a combination thereof.

4. The method of claim 3, wherein the spray application system comprises a hose system fluidly coupling the proportioner system to the spray gun for the delivery of the at least one fluid, and wherein the sensor is disposed in the hose system, in the proportioner system, in the spray gun, or in a combination thereof.

5. The method of claim 4, comprising sending signal via an electrically conductive element included in the hose system.

6. A fluid delivery system, comprising:
a status indicator system comprising a processor, the processor configured to:
receive a first signal indicative of a first status of operations of a spray application system; and
provide to an operator of a spray gun, via a display system, a visualization representative of the first status of operations, wherein the spray application system comprises a proportioner system configured to control a flow of a plurality of fluids to achieve a specified ratio of the plurality of fluids in a spray foam of the spray gun during operations, to apply temperature to control a temperature of the fluids, and to communicatively couple to the status indicator system, wherein the display system is configured to be mounted on the spray gun, worn by the operator, or a combination thereof, wherein the first status of operations comprises a spray foam status for the proportioner system.

7. The system of claim 6, wherein the display system comprises a colored light and wherein the visualization comprises a color representative of the first status of operations.

8. The system of claim 7, wherein the display system is configured to project the colored light onto a spray area of the spray gun.

9. The system of claim 6, wherein the visualization comprises a text, an image, or a combination thereof, representative of the first status of operations.

10. The system of claim 6, wherein the spray application system comprises a hose system fluidly coupling the proportioner system to the spray gun for the delivery of the at least one fluid.

11. The system of claim 10, wherein the hose system comprises an electrically conductive element used to transmit the first signal from the proportioner system to the display system.

12. The system of claim 11, wherein the hose system is configured to provide for power line communications (PLC) via the electrically conductive element.

13. The system of claim 10, wherein an electrical conduit not a component of the hose system is used to send power, the first signal, or a combination thereof, from the proportioner to the display system.

14. The system of claim 6, wherein the processor is configured to receive a second signal indicative of a second status of operations of the spray application system, and to provide a haptic feedback to the operator representative of the second status of operations.

15. The system of claim 6, wherein the first status of operations comprises a level of the at least one fluid in a tank, a temperature of the at least one fluid, a pressure of the at least one fluid, a ratio of the at least one fluid to a second fluid to be combined in the spray gun, an alarm, an alert, an ambient temperature, an indication of quality of spray, an indication of depth of spray, or a combination thereof.

16. A non-transitory computer-readable storage media comprising instructions which, when executed, cause at least one processor to perform operations comprising:
receiving, at a status indicator system comprising a processor, a first signal indicative of a first status of operations of a spray application system; and
displaying to an operator of a spray gun, via a display system, a visualization representative of the first status of operations, wherein the spray application system comprises a proportioner system configured to control a flow of a plurality of fluids to achieve a specified ratio of the plurality of fluids in a spray foam of the spray gun during operations, to apply temperature to control a temperature of the fluids, and to communicatively couple to the status indicator system, wherein the display system is configured to be mounted on the spray gun, worn by the operator, or a combination thereof, wherein the first status of operations comprises a spray foam status for the proportioner system.

17. The non-transitory computer-readable storage media of claim 16, wherein the display system comprises a colored light and wherein the visualization comprises a color representative of the first status of operations, a text, an image, or a combination thereof, representative of the first status of operations.

18. The non-transitory computer-readable storage media of claim 16, comprising instructions which, when executed, cause the at least one processor to perform operations comprising receiving the signal from a sensor disposed in the spray application system, and wherein the sensor comprises a pressure sensor, a temperature sensor, a fluid level sensor, a flow sensor, a chemical composition sensors, a speed sensor, and electric measurement sensor, or a combination thereof.

19. The non-transitory computer-readable storage media of claim 16, comprising instructions which, when executed, cause the at least one processor to perform operations comprising receiving a second signal indicative of a second status of operations of the spray application system, and providing a haptic feedback to the operator representative of the second status of operations.

20. The non-transitory computer-readable storage media of claim 16, comprising instructions which, when executed, cause the at least one processor to perform operations comprising controlling a slave modem to transmit the first signal to the colored light.

* * * * *